United States Patent
Price et al.

(10) Patent No.: US 10,354,501 B2
(45) Date of Patent: Jul. 16, 2019

(54) AUTONOMOUS, LOW ENERGY, ACCESS INDICATION SYSTEM

(71) Applicant: The Boeing Company, Huntington Beach, CA (US)

(72) Inventors: Wade T. Price, Redmond, WA (US); Raymond Roeder, Everett, WA (US); Bruce R. Olsen, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/346,275

(22) Filed: Nov. 8, 2016

(65) Prior Publication Data

US 2018/0130322 A1 May 10, 2018

(51) Int. Cl.
*G08B 13/02* (2006.01)
*H02J 3/38* (2006.01)
*H02J 3/46* (2006.01)
*G07C 11/00* (2006.01)
*H04W 84/18* (2009.01)

(52) U.S. Cl.
CPC .............. *G08B 13/02* (2013.01); *G07C 11/00* (2013.01); *H02J 3/383* (2013.01); *H02J 3/386* (2013.01); *H02J 3/46* (2013.01); *H04W 84/18* (2013.01)

(58) Field of Classification Search
None
See application file for complete search history.

(56) References Cited

U.S. PATENT DOCUMENTS

| 4,797,657 | A | * | 1/1989 | Vorzimmer | G08B 13/19 340/430 |
| 6,047,588 | A | * | 4/2000 | Danilychev | B65D 88/14 206/524.8 |
| 6,768,420 | B2 | * | 7/2004 | McCarthy | B60N 2/002 180/272 |

(Continued)

FOREIGN PATENT DOCUMENTS

EP   2506229 A1   10/2012

OTHER PUBLICATIONS

Extended European Search Report dated Feb. 23, 2018 in corresponding European Application No. 17185984.6.

*Primary Examiner* — Chico A Foxx
(74) *Attorney, Agent, or Firm* — MH2 Technology Law Group LLP

(57) ABSTRACT

A system and method for detecting access to a monitored space including one or more controllers, one or more data collectors, and one or more sensors. The sensors are self-powered, wireless components having two states. Each time a sensor detects a physical change within the space, the sensor switches from one state to another. Each incidence of a sensor changing states is recorded within the sensor. The sensors do not continuously transmit the changed state information and rather report data only when queried by a controller. A data collector may be used to process the data from the sensors before transmitting it to the controller. The wireless, self-powered, limited data storing sensors enable the system to function independently of the environment's network infrastructure and power source. Once a human operator receives notice of an access event via the controller, the operator can escalate the level of inspection of the area.

9 Claims, 4 Drawing Sheets

(56) References Cited

U.S. PATENT DOCUMENTS

| | | | | |
|---|---|---|---|---|
| 6,844,817 | B2* | 1/2005 | Gleine | B64D 45/0015 244/118.5 |
| 7,355,508 | B2* | 4/2008 | Mian | B60R 25/00 340/425.5 |
| 7,936,285 | B2* | 5/2011 | Kneller | G06F 3/013 340/540 |
| 7,965,200 | B2* | 6/2011 | Lamoree | B64D 25/18 340/539.22 |
| 8,515,656 | B2* | 8/2013 | Reed | B64D 9/00 244/137.1 |
| 8,816,822 | B2* | 8/2014 | Wyler | H04Q 9/00 340/1.1 |
| 8,876,050 | B2* | 11/2014 | Wentland | B64C 1/1407 244/118.5 |
| 8,963,691 | B1* | 2/2015 | Mitchell | H04Q 9/00 340/10.42 |
| 9,041,559 | B2* | 5/2015 | Kohlmeier-Beckmann | B64D 11/003 340/945 |
| 9,582,692 | B2* | 2/2017 | Mitchell | G06K 7/0008 |
| 9,623,983 | B2* | 4/2017 | Kumar | B64D 45/00 |
| 2004/0098911 | A1* | 5/2004 | Okamoto | G05B 23/0264 47/58.1 R |
| 2005/0002391 | A1* | 1/2005 | Matsuda | G06F 13/385 370/389 |
| 2006/0004499 | A1* | 1/2006 | Trego | B64D 45/00 701/31.4 |
| 2007/0176793 | A1* | 8/2007 | Bruch | B60R 25/1003 340/945 |
| 2007/0232164 | A1* | 10/2007 | Swan | B63C 9/20 441/108 |
| 2008/0100450 | A1* | 5/2008 | Ayyagari | B64D 25/18 340/572.7 |
| 2008/0186139 | A1 | 8/2008 | Butler et al. | |
| 2008/0186173 | A1 | 8/2008 | Gates | |
| 2009/0120653 | A1* | 5/2009 | Thomas | A62C 3/02 169/61 |
| 2009/0243891 | A1* | 10/2009 | Lamoree | B64D 25/18 340/945 |
| 2010/0090809 | A1* | 4/2010 | Yeo | G06K 19/0717 340/10.41 |
| 2010/0127837 | A1 | 5/2010 | Addy | |
| 2010/0189887 | A1* | 7/2010 | Nielsen | G06Q 10/06 427/136 |
| 2011/0193663 | A1* | 8/2011 | Peczalski | G07C 9/00309 335/179 |
| 2012/0029333 | A1* | 2/2012 | Dogwiler | A61M 5/158 600/365 |
| 2013/0186951 | A1* | 7/2013 | Zhu | G06K 19/07779 235/375 |
| 2013/0258904 | A1* | 10/2013 | Kaufmann | H04W 84/20 370/255 |
| 2014/0001062 | A1* | 1/2014 | Hollm | B64D 13/00 206/216 |
| 2014/0167912 | A1* | 6/2014 | Snyder | G07C 9/00166 340/5.7 |
| 2014/0230445 | A1* | 8/2014 | Huntington | F02C 9/28 60/772 |
| 2015/0166072 | A1* | 6/2015 | Powers | B60W 40/06 701/1 |
| 2015/0370320 | A1* | 12/2015 | Connor | A61B 5/6831 345/173 |
| 2016/0268696 | A1* | 9/2016 | Hosseini | G06K 7/0008 |
| 2016/0275769 | A1 | 9/2016 | McIntosh | |
| 2017/0041739 | A1* | 2/2017 | Kumar | G06K 7/10366 |
| 2017/0097792 | A1* | 4/2017 | Carter | G06F 17/5009 |
| 2017/0144773 | A1* | 5/2017 | Raman | B64D 45/00 |
| 2017/0152044 | A1* | 6/2017 | Balasubramanian | B64D 45/0005 |
| 2017/0278061 | A1* | 9/2017 | Skaaksrud | H04L 67/303 |
| 2017/0303015 | A1* | 10/2017 | Herges | H04Q 9/00 |

* cited by examiner

AUTONOMOUS, LOW ENERGY, ACCESS INDICATION SYSTEM

TECHNOLOGICAL FIELD

The present disclosure relates generally to security monitoring and, in particular, to an improved system and method for detecting and reporting access to a monitored space.

BACKGROUND

There are many industries in which the security of defined spaces is critical to operational safety. In the aviation industry, for example, aircraft and grounds personnel are required to perform inspections of aircraft in and about areas that could be susceptible to tampering prior to dispatch of the aircraft.

One existing method for determining whether a secure area has been inappropriately accessed is by human inspection of the area. Such human inspections are time consuming and can result in missed areas (i.e., unintended "human error"). Another downside of human inspections is that the individuals performing the searches could be prone to getting injured, especially when attempting to inspect areas that have accessibility challenges.

Another existing method for inspecting secure areas involves the placement of wired cameras for video monitoring of the area. However, particularly in the case of aircraft, such continuous monitoring and data transmission systems require large amounts of bandwidth and power while operational, and therefore burden the aircraft's network infrastructure. Such prior art systems also require a significant outlay of labor to be properly installed.

Thus, it is desirable to have an improved system and method for detecting and reporting access to a monitored space.

BRIEF SUMMARY

In view of the foregoing background, example implementations of the present disclosure provide a system and method for detecting and reporting access to a monitored space.

The system includes at least one controller, at least one wireless sensor having a first state and a second state, and at least one data collector. The data collector wirelessly receives signals from the controller and the sensor, and wirelessly transmits signals to the controller and the sensor. When the sensor senses a physical change in the monitored space, the sensor automatically switches between the first state and the second state, records information about the changed state, and stores the information about the changed state until queried by the controller via the data collector, at which time the sensor reports the information about the changed state to the controller via the data collector. The sensor stores only the information about the changed state and reports the information about the changed state only when queried by the controller. The sensor is powered by energy harvesting or can be self-powered such as with solar energy, thermal energy, wind energy, kinetic energy, or battery power. The system functions substantially independently from the network infrastructure of the space and from a power source of the space. An example of a physical change in the space is access to the space.

In a further implementation of the present disclosure, a system for detecting and reporting access to a monitored space is provided that includes at least one controller and at least one wireless sensor having a first state and a second state. When the sensor senses a physical change in the space, the sensor automatically switches between the first state and the second state, records information about the changed state, and stores the information about the changed state until queried by the controller, at which time the sensor reports the information about the changed state to the controller.

In yet a further implementation of the present disclosure, a method for detecting and reporting access to a monitored space is provided including the steps of placing in the space at least one wireless sensor having a first state and a second state, and configuring the sensor to switch between the first state and the second state when the sensor detects a physical change within the space, record information about the changed state, store the information about the changed state until receipt of a query command from a controller, and report the information about the changed state to the controller after receipt of the query command. The method further includes the step of using the controller to wirelessly transmit the query command to the sensor and display the information about the changed state received from the sensor.

The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
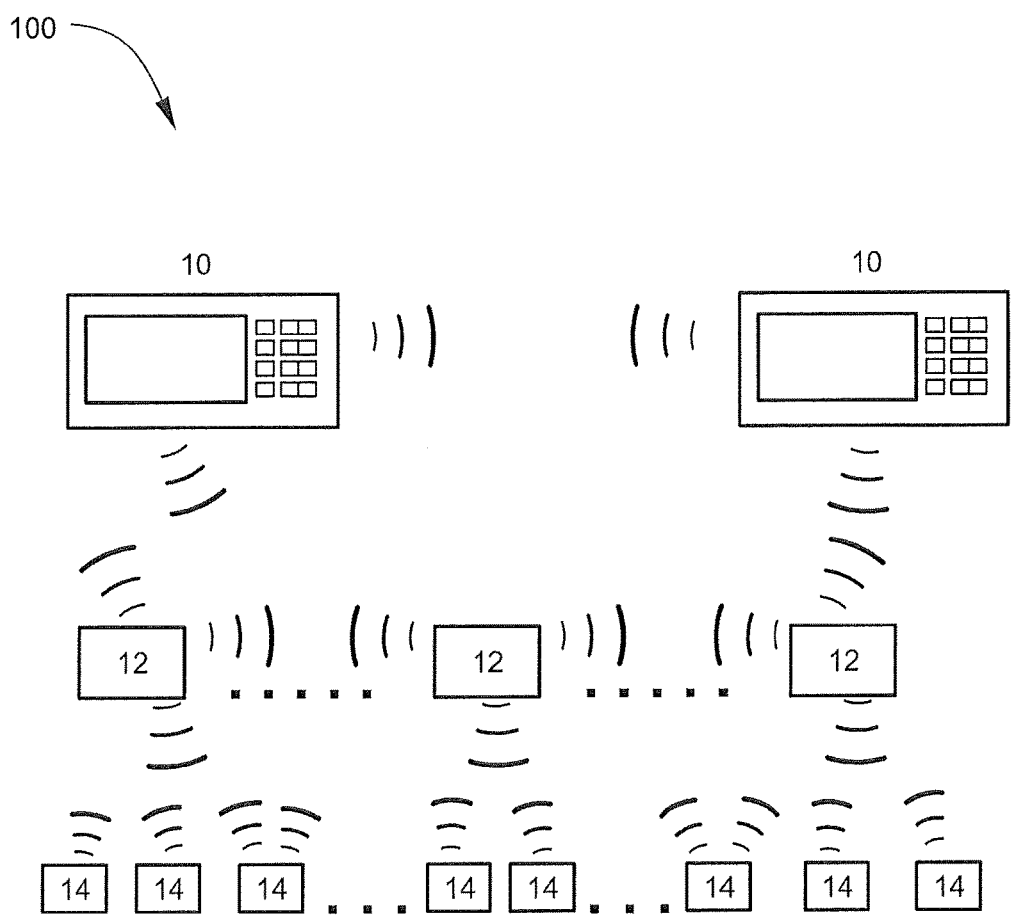
FIG. 1 is a block diagram of an autonomous, low energy, micro electromechanical system that detects and reports access to a monitored space in accordance with an example implementation of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, something described as being above something else (unless otherwise indicated) may instead be below, and vice versa; and similarly, something described as being to the left of something else may instead be to the right, and vice versa. Like reference numerals refer to like elements throughout.

Example implementations of the present disclosure will be primarily described in conjunction with aviation applications. It should be understood, however, that example implementations may be utilized in conjunction with a variety of other applications, both in the aviation industry and outside of the aviation industry.

According to example implementations of the present disclosure, an autonomous, low energy, micro-electromechanical system (MEMS) is provided that detects access to a space by sensing a physical change within such space. In the case of a monitored area that must be verified as not being accessed or tampered, examples of physical changes may include a door being opened or closed, a drawer being opened or closed, or some other physical object being moved in or out of the space.

Figure 2:
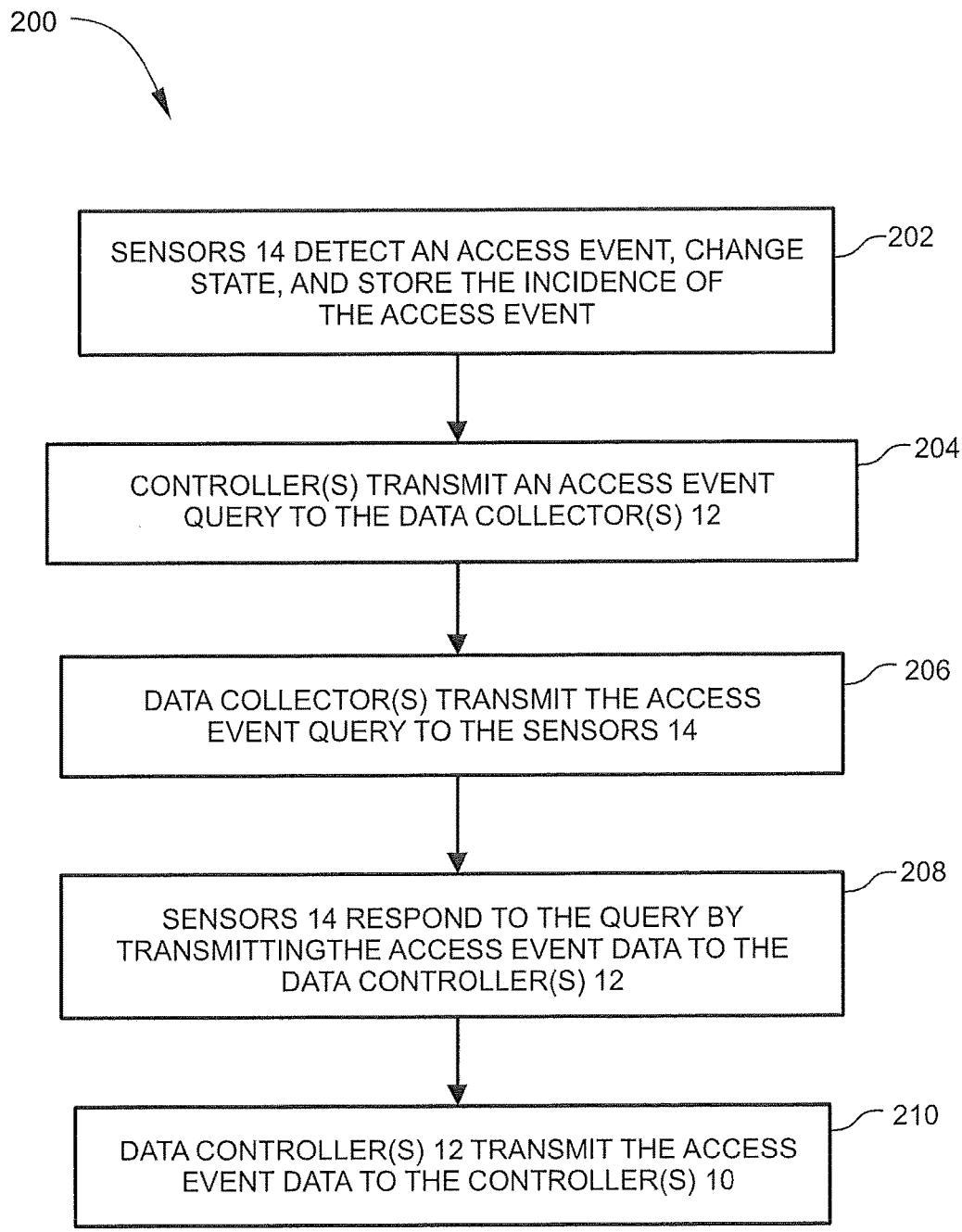
FIG. 2 is a flowchart for a method of detecting and reporting access to a monitored space in accordance with an example implementation of the present disclosure.

As shown in FIGS. 1 and 2, the autonomous, low energy micro-electromechanical system (MEMS) 100 includes one or more controllers 10, one or more data collectors 12, and one or more sensors 14. The sensors 14 are markers or sensors that are self-powered, wireless components having two states. The sensors 14 may be powered via battery or they may be energy harvesting in that their energy is derived from external sources (e.g., solar energy, thermal energy, wind energy, and kinetic energy). The sensors 14 are strategically placed within a space to be monitored. Each time a physical change within the monitored space is detected by a sensor 14, which is referred to herein as an access event, the sensor 14 switches from one state to another (block 202). Each incidence of a sensor 14 changing states because an access event was detected is recorded within such sensor 14. Unlike prior art systems, the sensors 14 do not continuously transmit the access event information in the absence of being queried. Thus, in the example of an aircraft, the present system 100 is able to operate without interference with the aircraft's operating system and without needing a dedicated power source which could cause a drain on the aircraft's power load.

The controllers 10 are used to query the sensors 14 about access events, namely, when the sensors 14 have changed states. The controllers 10 may include display units that enable a human operator to initiate a query about the status of a monitored space. When such a query is initiated, the query command is wirelessly transmitted from the controller 10 to the low-energy data collectors 12, which operate as transceiver data hubs (block 204). The data collectors 12 transmit the query command to the sensors 14 (block 206).

The sensors 14 respond to the query command with information about whether the sensors 14 changed states, meaning whether the sensors 14 sensed an access event. Such information is wirelessly transmitted from the sensors 14 back to the data collectors 12 (block 208), which process the response signals and transmit the data back to the controller(s) 10 to identify the sensors 14 that detected an access event (block 210). It should be understood, however, that in some example implementations, the data collectors 12 may not be needed such that query commands may be transmitted directly, and responses received directly, between the controller(s) 10 and sensors 14.

Once the human operator receives notice of an access event via the controller(s) 10, the operator can escalate the level of inspection of such area, such as with a human inspection, to confirm whether the area has been inappropriately accessed or tampered.

The foregoing described system 100 and method 200 for detecting access events substantially mitigates the cost, complexity, and labor-intensive installation of prior art monitoring systems because the system 100 of the present disclosure utilizes wireless components that may be energy-harvesting, thereby eliminating reliance on the aircraft's electrical power. The miniaturization of the components also allows for utilization in very confined and remote spaces that are difficult, time-consuming, and injury-prone for human inspection. Additionally, because the sensors 14 store only information about whether a change in state occurred, and such sensors 14 report out only when queried, the aircraft's infrastructure is not burdened with the system 100 requiring large amounts of bandwidth for transmission of data as is the case in prior art systems that continuously report out data. In summary, the system 100 of the present disclosure is able to function substantially independently of the aircraft's operational environment.

It should be understood that while an example of an aircraft is used herein to describe an example implementation of the system 100, the system 100 may be utilized in other types of applications such as inventory control for warehouses. The system 100 can further be implemented in alternative forms of transportation such as buses and trains.

According to example implementations of the present disclosure, the various components of the improved system and method for detecting access to a space may be implemented by various means including hardware, alone or under direction of one or more computer program code instructions, program instructions or executable computer-readable program code instructions from a computer-readable storage medium.

In one example, one or more apparatuses may be provided that are configured to function as or otherwise implement the system and method for arbitrarily expanding and compressing data shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementation for the system and method of the present disclosure may include one or more of a number of components such as a processor (e.g., processor unit) connected to a memory (e.g., storage device), as described above. The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk—read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the system and method for arbitrarily expanding and compressing data as described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 3:
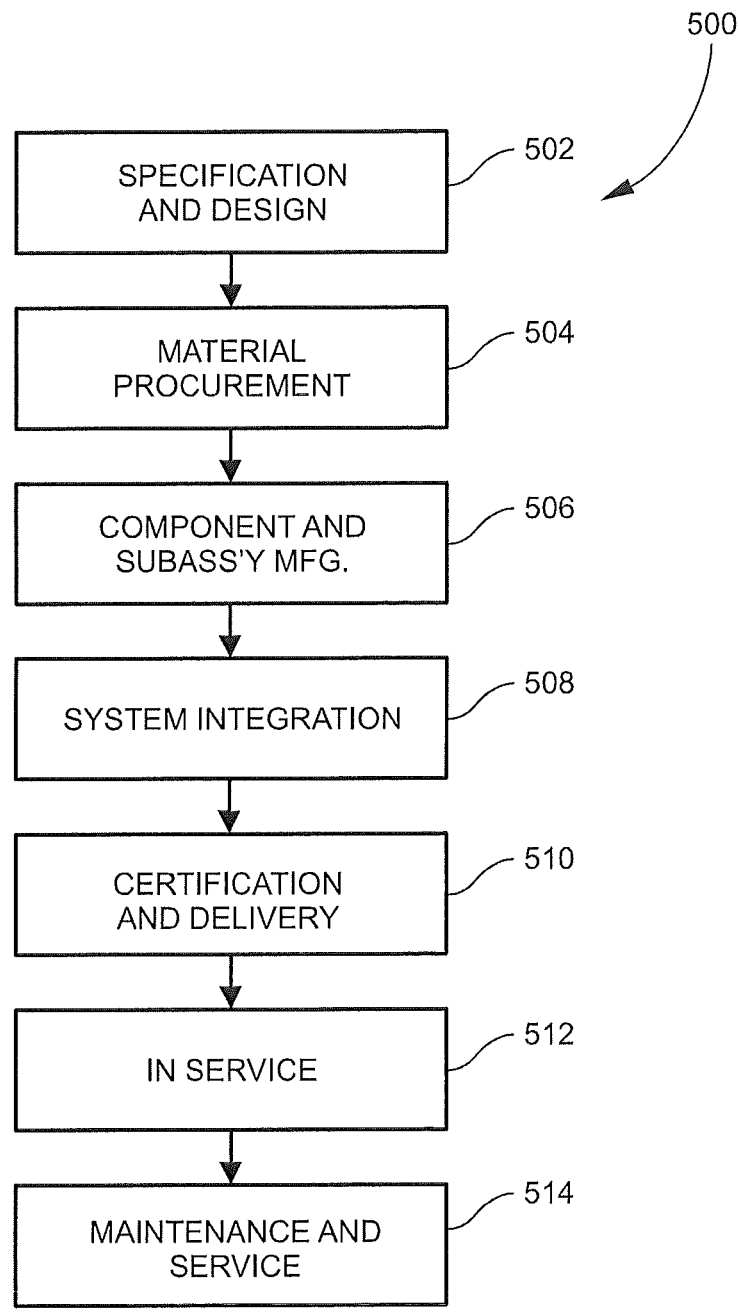
FIG. 3 is a block diagram of aircraft production and service methodology.
Figure 4:
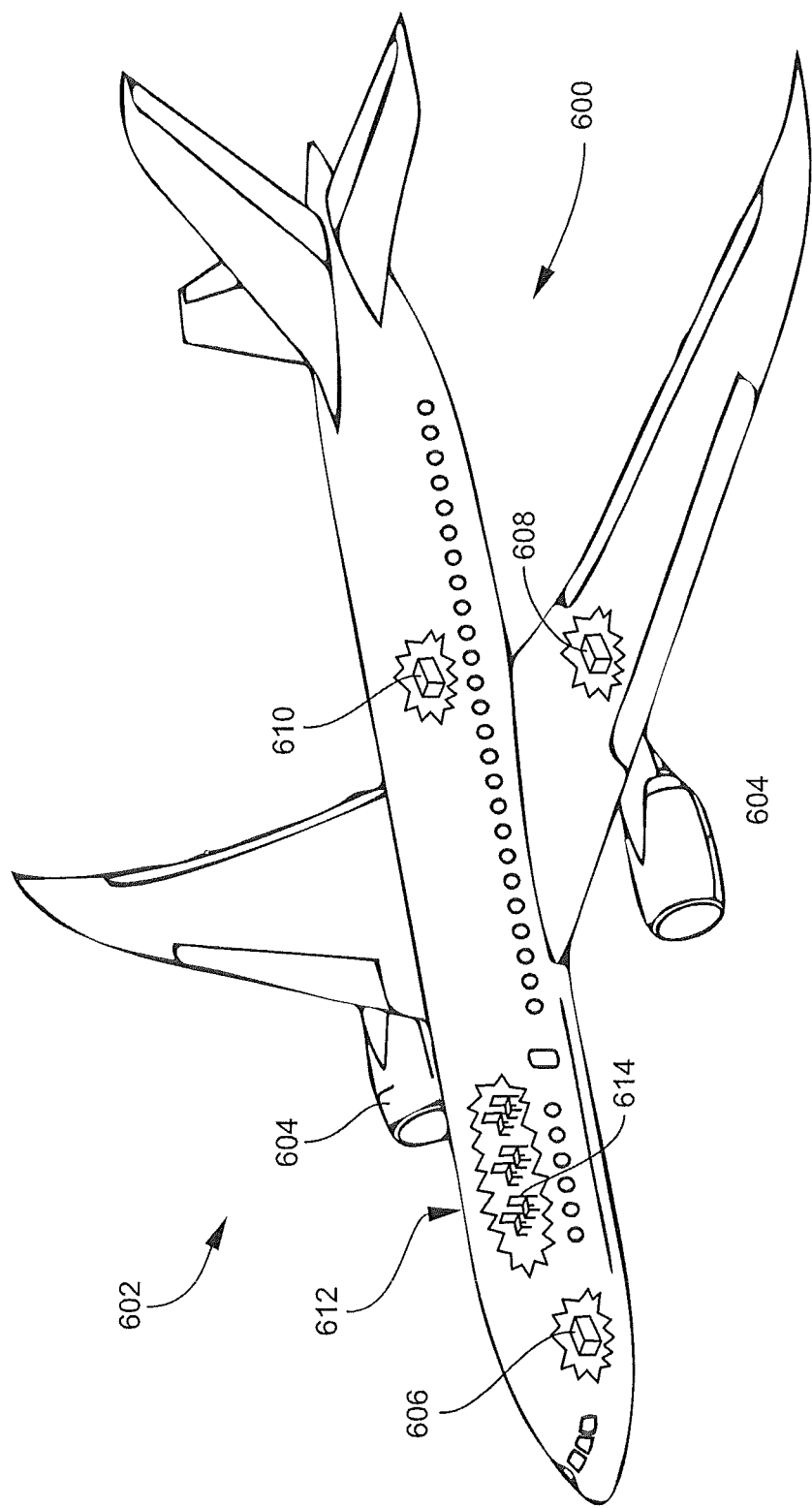
FIG. 4 is a schematic illustration of an aircraft.

As referenced above, examples of the present disclosure may be described in the context of aircraft manufacturing and service. As shown in FIGS. 3 and 4, during pre-production, illustrative method 500 may include specification and design (block 502) of aircraft 602 and material procurement (block 504). During production, component and subassembly manufacturing (block 506) and system integration (block 508) of aircraft 602 may take place. Thereafter, aircraft 602 may go through certification and delivery (block 510) to be placed in service (block 512). While in service, aircraft 602 may be scheduled for routine maintenance and service (block 514). Routine maintenance and service may include modification, reconfiguration, refurbishment, etc, of one or more systems of aircraft 602.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 4, aircraft 602 produced by illustrative method 500 may include airframe 612 with a plurality of high-level systems 600 and interior 614. Examples of high-level systems 600 include one or more of propulsion system 604, electrical system 606, hydraulic system 608, and environmental system 610. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 500. For example, components or subassemblies corresponding to component and subassembly manufacturing 506 may be fabricated or manufactured in a manner similar to components or subassemblies produced while aircraft 602 is in service. Also, one or more examples of the apparatus(es), method(s), or combination thereof may be utilized during production stages 506 and 508, for example, by substantially expediting assembly of or reducing the cost of aircraft 602. Similarly, one or more examples of the apparatus or method realizations, or a combination thereof, may be utilized, for example and without limitation, while aircraft 602 is in service, e.g., maintenance and service stage (block 514).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A micro-electromechanical system for detecting and reporting access to a secure monitored enclosed physical space in an aircraft, wherein the system functions substantially independently from network infrastructure of the aircraft and from a power source of the aircraft, the system comprising:
   at least one controller;
   at least one wireless sensor having only a first state and a second state, wherein the at least one wireless sensor is operated with power from kinetic energy; and
   at least one data collector that wirelessly receives signals from the at least one controller and the at least one wireless sensor, and wirelessly transmits signals to the at least one controller and the at least one wireless sensor;
   wherein when the at least one wireless sensor senses an access event comprising an opening of the space, the at least one wireless sensor automatically switches between the first state and the second state to represent the access event, records information about the changed state representing the access event, and stores the information about the changed state representing the access event until queried by the at least one controller via the at least one data collector, at which time the at least one wireless sensor reports the information about the changed state representing the access event to the at least one controller via the at least one data collector, wherein the at least one wireless sensor stores only the information about the changed state representing the access event.

2. The system of claim 1 wherein the at least one wireless sensor reports the information about the changed state representing the access event only when queried by the at least one controller.

3. The system of claim 1 wherein the at least one wireless sensor is powered by energy harvesting.

4. A micro-electromechanical system for detecting and reporting access to a secure monitored enclosed physical space in an aircraft, wherein the system functions substantially independently from network infrastructure of the aircraft and from a power source of the aircraft, the system comprising:
   at least one controller; and
   at least one wireless sensor having only a first state and a second state, wherein the at least one wireless sensor is operated with power from kinetic energy; wherein when the at least one wireless sensor senses an access event comprising an opening of the space, the at least one wireless sensor automatically switches between the first state and the second state to represent the access event, records information about the changed state representing the access event, and stores the information about the changed state representing the access event until queried by the at least one controller, at which time the at least one wireless sensor reports the information about the changed state representing the access event to the at least one controller, wherein the at least one wireless sensor stores only the information about the changed state representing the access event.

5. The system of claim 4 wherein the at least one wireless sensor is powered by energy harvesting.

6. A method for detecting and reporting access to a secure monitored enclosed physical space in an aircraft using a micro-electromechanical system, wherein the system functions substantially independently from network infrastructure of the aircraft and from a power source of the aircraft, the method comprising the steps of:
   placing in the space at least one wireless sensor of the system in wireless communication with a controller of the system, the at least one wireless sensor having only a first state and a second state, wherein the at least one wireless sensor is operated with power from kinetic energy; and
   configuring the at least one wireless sensor to switch between the first state and the second state when the at least one wireless sensor detects an access event comprising an opening of the space,
   wherein the at least one wireless sensor records information about the changed state to represent the access event, stores the information about the changed state representing the access event until receipt of a query command from the controller, and reports the information about the changed state representing the access event to the controller after receipt of the query command, wherein the at least one wireless sensor stores only the information about the changed state representing the access event.

7. The method of claim 6 further comprising the step of using the controller to wirelessly transmit the query command to the at least one wireless sensor and to display the information about the changed state representing the access event reported from the at least one wireless sensor.

8. The method of claim 6 further comprising the steps of:
   the controller transmitting the query command to the at least one wireless sensor via a data collector; and the data collector processing the information about the changed state representing the access event from the at least one wireless sensor and transmitting the information about the changed state to the controller.

9. The method of claim 6 wherein the at least one wireless sensor reports the information about the changed state representing the access event only when queried by the controller.

\* \* \* \* \*